United States Patent [19]
Natale

[11] Patent Number: 4,812,700
[45] Date of Patent: * Mar. 14, 1989

[54] PORTABLE CONTAINMENT DEVICE FOR TREATMENT OF HAZARDOUS MATERIALS

[75] Inventor: Thomas Natale, Moorestown, N.J.

[73] Assignee: GPAC, Inc., Cinnaminson, N.J.

[*] Notice: The portion of the term of this patent subsequent to Dec. 2, 2003 has been disclaimed.

[21] Appl. No.: 936,509

[22] Filed: Dec. 1, 1986

Related U.S. Application Data

[63] Continuation-in-part of Ser. No. 777,560, Sep. 18, 1985, Pat. No. 4,626,291, which is a continuation of Ser. No. 543,850, Oct. 20, 1983, abandoned.

[51] Int. Cl.⁴ .............................................. B08B 5/04
[52] U.S. Cl. ......................................... 312/1; 15/227; 98/115.4; 134/21; 138/97; 312/3
[58] Field of Search .................... 312/5, 1, 3, 6; 134/6, 134/10, 21, 42; 15/227; 128/1 R, 1 B; 138/97; 98/115.1, 115.3, 115.4; 55/DIG. 29, DIG. 46

[56] References Cited

U.S. PATENT DOCUMENTS

| | | |
|---|---|---|
| 2,039,490 | 5/1936 | Mikelson . |
| 2,786,740 | 3/1957 | Taylor et al. . |
| 2,862,307 | 12/1959 | Bloomer et al. . |
| 2,972,353 | 2/1961 | Quest . |
| 3,051,164 | 8/1962 | Trexler . |
| 3,354,922 | 11/1967 | James . |
| 3,396,701 | 8/1968 | Trexler . |
| 3,415,582 | 12/1968 | Trexler ................................. 312/1 |
| 3,492,987 | 2/1970 | Parker ................................. 312/1 X |
| 3,511,547 | 5/1970 | Schmieder et al. . |
| 3,802,416 | 4/1974 | Cazalis . |
| 3,907,389 | 9/1975 | Cox et al. . |
| 4,108,509 | 8/1978 | Piet et al. . |
| 4,335,712 | 6/1982 | Trexler . |
| 4,485,490 | 12/1984 | Akers et al. ........................ 312/1 X |
| 4,626,291 | 12/1986 | Natale . |

FOREIGN PATENT DOCUMENTS

| | | |
|---|---|---|
| 569649 | 1/1959 | Canada . |
| 1188191 | 6/1985 | Canada . |
| 3004066 | 8/1981 | Fed. Rep. of Germany .......... 312/1 |
| 1567270 | 5/1980 | United Kingdom . |
| A2157822 | 10/1985 | United Kingdom .................... 312/1 |
| 8605431 | 9/1986 | World Int. Prop. O. .............. 312/1 |

OTHER PUBLICATIONS

"Guidance for Controlling Friable Asbestos-Containing Materials in Buildings," EPA Report Number 560/5-83-002, Mar. 1983, Field Studies Branch, Design and Development Branch, Exposure Division, Office of Toxic Substances, OPTS, EPA.

SourceFinders Technical Report: Controlling Asbestos Contamination with Negative Air Filtration Systems, The U.S. Government's Technical Data Package, ISBN 0-917097-01-7, 1984.

Primary Examiner—Peter A. Aschenbrenner
Assistant Examiner—Thomas A. Rendos
Attorney, Agent, or Firm—Fleit, Jacobson, Cohn & Price

[57] ABSTRACT

A containment bag system specifically used for the removal of asbestos insulation from asbestos covered pipes and valves without contamination of the worker or the surrounding environment. A method of removing asbestos and other hazardous materials from limited areas uses a safe containment system. A method for manufacturing the containment system includes heat sealing a length of lay-flat tubing along a bottom edge and preferably along two side edges.

26 Claims, 3 Drawing Sheets

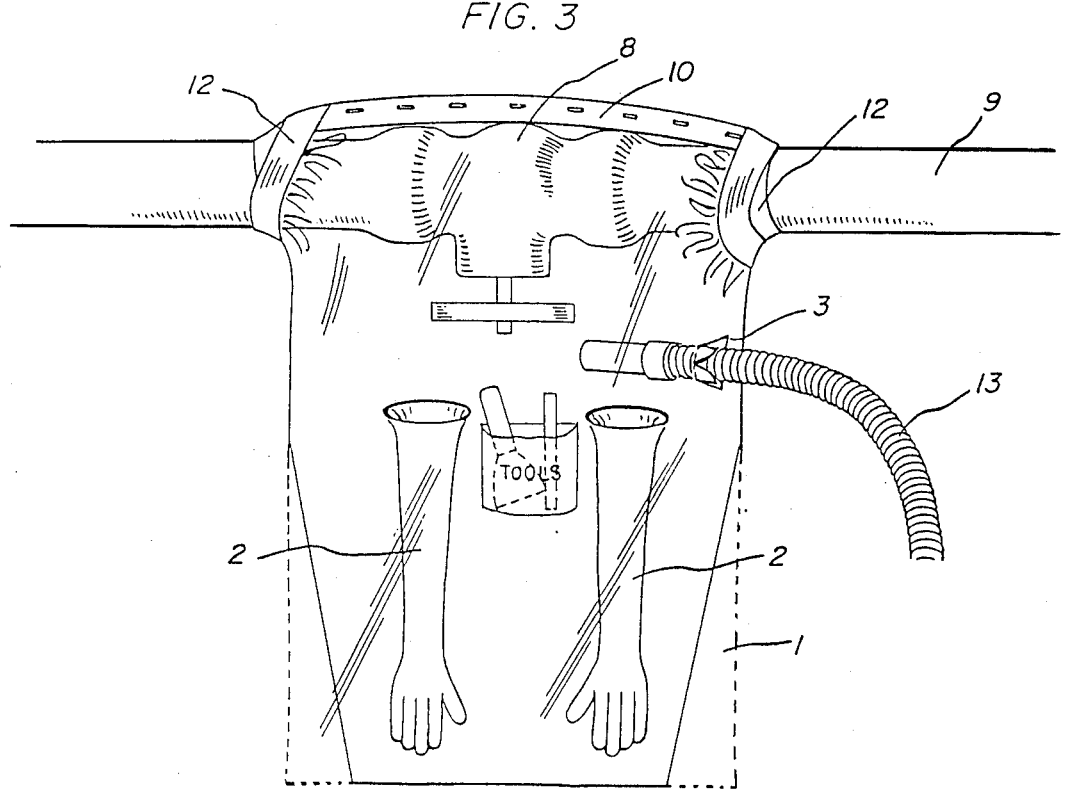
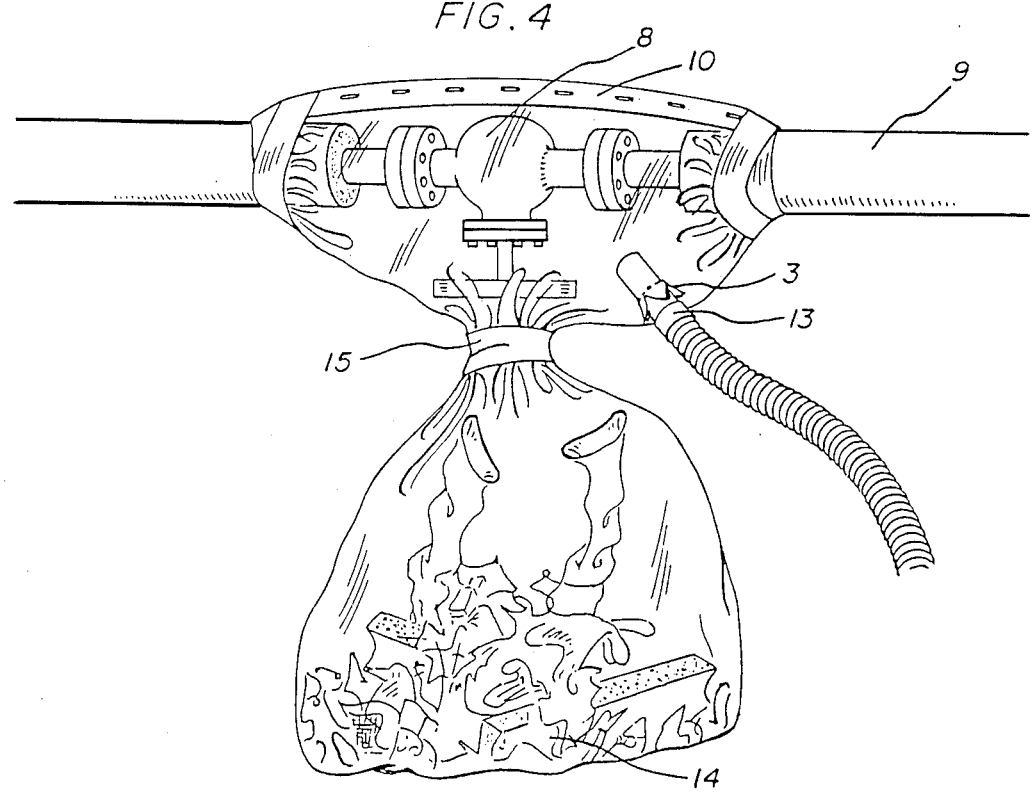

PORTABLE CONTAINMENT DEVICE FOR TREATMENT OF HAZARDOUS MATERIALS

This application is a continuation-in-part of U.S. patent application Ser. No. 777,560, filed Sept. 18, 1985, now U.S. Pat. No. 4,626,291, which is a continuation of U.S. patent application Ser. No. 543,850, filed Oct. 20, 1983, now abandoned.

FIELD OF THE INVENTION

This invention relates to the transfer of asbestos or other hazardous materials from an area of limited contamination to a portable containment and disposal device for use during removal of asbestos or other hazardous materials, and to a method for manufacturing such a device.

BACKGROUND OF THE INVENTION

Asbestos-containing pipe insulation takes many forms, including chalky mixtures of magnesia and asbestos, preformed fibrous asbestos wrapping, asbestos fiber felt, corrugated paper, and insulating cement. In most cases, the insulating material is covered with a protective jacket (lagging) made of cloth, tape, paper, metal or cement. Occasionally, asbestos millboard is used as outside lagging on removable insulating covers for stiffness. Lagging on pipes and boilers prevents spontaneous fiber release and helps protect against disturbance.

Exposure to airborne asbestos regardless of the level, involves some health risks. When damage occurs to asbestos insulation and lagging on pipes and valves, repair and/or removal of the material is essential. The potential for exposure to airborne asbestos during such operations cannot be ignored. Worker protection is essential and is, in general, demanded by law. Proper work area containment is highly recommended for all abatement techniques. Once abatement work begins, all uninvolved persons should be kept out of the area.

Containment typically means construction of barriers with 6 mil polyethylene plastic sheets joined with folded seams, and with sealing tape at the seams and boundaries. Air locks and worker decontamination facilities with showers are recommended. So, too, are reduced air pressure systems, such as disclosed in U.S. Pat. No. 4,604,111. Without adequate containment, increased exposure for building occupants is likely. Abatement activities should be conducted during vacations or other times when few people are in the building.

The cost of containment in such circumstances may equal or, indeed, exceed the cost of abatement. Further, it still requires that workers enter the containment area in order to conduct the abatement operation. Finally, it should be noted that the removal of the asbestos insulation from the pipes and valves still requires safe packaging of the material for removal from the containment area for ultimate disposition.

It is an object of this invention to provide a containment device which will be relatively inexpensive compared to general containment procedures of the past.

It is another object of this invention to provide a method of constructing a device suitable for asbestos and other hazardous material containment.

A further object of this invention is to provide a method for removing contaminates such as asbestos from pipes and valves in which the worker is protected and in which the cost of abatement is significantly reduced through reduced costs in containment and disposition of the final debris of the abatement procedure.

These and other objects will be apparent from the subsequent disclosure and appended claims.

SUMMARY OF THE INVENTION

A heat resistant containment bag is adapted to be sealed around the area of hazardous material to be treated or removed. Armholes with arm sleeves and gloves are heat sealed on the inside of the bag and an inside pouch is provided for tools to allow the worker to remove the hazardous material without exposure to the material. A sealed side port allows access for wetting the hazardous material and for evacuating the bag with a suitable vacuum device.

BRIEF DESCRIPTION OF THE DRAWING

FIG. 3 is a schematic drawing in which the containment device is sealed around an insulated valve with an appropriate vacuum device in place and sealed to the containment device.

FIG. 4 is a schematic drawing of the containment device at the conclusion of asbestos insulation removal from the valve, in which the containment is collapsed by vacuum and the asbestos detritus is isolated in the lower section of the containment device.

DETAILED DESCRIPTION OF THE PREFERRED EMBODIMENTS

Figure 1:
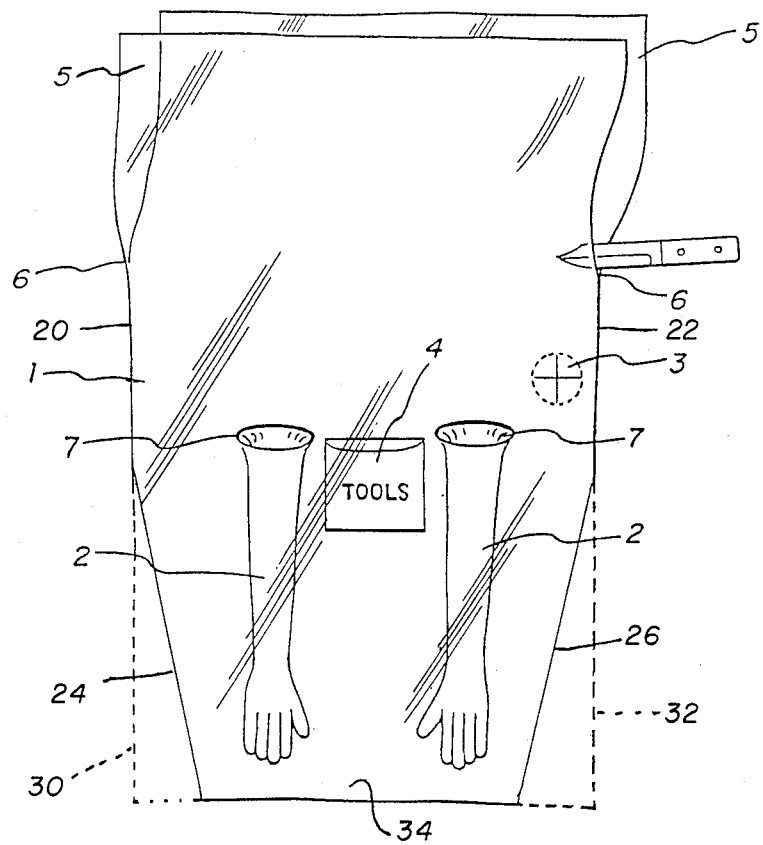
FIG. 1 is a schematic drawing of the containment device of the present invention.

With reference to the drawings, and in particular with reference to FIG. 1, the containment device of the present invention comprises a flexible, heat resistant, generally transparent, plastic bag 1, open at one end, equipped with sealed gloves 2 for hand access to the interior of the bag, a sealed side port 3 to allow access by a suitable wetting device and/or vacuum device to the interior of the bag, and an interior tool pouch The open end of the bag is provided with flaps or is slit to provide flaps 5. A side inlet port 3 which is formed by making a hole in the side of the bag is positioned generally between the terminal points 6 of the flaps and the connection point 7 for the sealed gloves. A tool pouch 4 is positioned generally between the two gloves 2 at a point not higher than the level of attachment of the gloves. It should be noted that in this description, the terms "higher" and "lower" are relative to the position in which the bag would normally be used, with the closed end of the bag at the bottom and the open end of the bag at the top.

The invention will be described in detail with respect to the removal of asbestos insulation from an insulated valve of a boiler room which includes steam conducting pipes. Such a valve is shown as 8 in the schematic drawing of FIG. 2. If the containment bag is not precut, the sides of the bag are cut from the top a sufficient distance to accommodate the pipe 9 and valve 8 to be treated. Any tools that will be needed for working on the insulation should be inserted in the tool pouch 4 or, if there is no tool pouch, in the bottom of the containment bag. 1 The bag 1 is then placed around the pipe 9 and valve 8 with the cut flaps 5 overlapping. The open edges of the flaps are then folded together until the bottom of the slit sides is close enough to the bottom of the pipe 9 to permit sealing.

The folded edges of the flaps 5 are then sealed with staples and tape and such additional support as might be needed to provide seam 10. This seam will, in effect, support not only the weight of the bag but any material placed in the bag including the accumulated debris from removal of the insulation.

The sealed side port 3 can then be opened for the insertion of a wetting tube 11. Water or other suitable liquid is sprayed onto the surface of the asbestos to be removed, in accordance with standard practices, to reduce dust. Either before or after wetting of the area, the edges of the bag around the working area are sealed, for example with tape, to form a reasonably tight seal (such a seal is shown as 12 in FIG. 3). This seal should, of course, be as tight as reasonably possible, but need not be a total seal.

As is shown in FIG. 3, before asbestos removal a suitable vacuum device 13 such as described in U.S. Pat. No. 4,613,348 (having a filter efficiency of 99.95% at 0.3 microns or better) is inserted through the side port and sealed in place. Preferably, throughout the asbestos removal operation, a reduced air pressure is maintained so that if there is any leakage around seals 12, there will be an inflow of air rather than an outflow of asbestos fiber-contaminated air. Suitably the vacuum device 3 can be sealed to the containment bag 1 with tape.

With the vacuum device 13 in place, the worker inserts his arm and hands into the armholes and gloves 2, and proceeds to remove the asbestos from the valve fitting 8 and pipe 9. As noted previously, it is desirable but not essential to maintain a slight vacuum on the system. When the asbestos removal job has been completed, however, the vacuum device 13 should be operated at full vacuum to remove air from the bag 1 to the point of causing partial collapse of the bag. The bag 1 is then squeezed tightly as close to the top as possible, but below the vacuum device entry into the bag at 3, and twist-sealed and taped shut to keep the asbestos debris material safely at the bottom of the bag. This condition is illustrated in detail in the drawing of FIG. 4 in which the debris is shown as 14 at the bottom of the bag and the center of the bag is sealed at 15. The vacuum device 13 is allowed to run for a short period after sealing to insure that any airborne particles are removed from the section of the device above the seal 15.

At this point, vacuum device 13 can be turned off and the vacuum device hose 13 removed from the port 3. The side port 3 is then sealed with staples and tape for safety. The top of the containment bag may now be cut and the bag removed from the working area and placed into another plastic bag for proper disposal. The vacuum device can now be used to vacuum the surface of the work area to remove any remaining particulates. The cut and exposed edges of the asbestos insulation can now be removed.

Where long sections of pipe are cleansed of asbestos insulation, it may not be necessary to remove the containment bag after only a single use. For a typical use, the containment bag is designed to cover about a three foot length of pipe. When the pipe is cleaned, the bag can be slid to the next section and another section of three feet can be cleaned. The bag will always be anchored on a clean pipe at one end and an unbroken asbestos covering surface at the other with any debris removed in between collected at the bottom of the bag.

While not intended as a limitation it should be noted that the preferred embodiment of the present invention utilizes a 2 to 10 mil, preferably 5 mil, clear to translucent, depending on the thickness, bag measuring approximately 44" wide and 63" long as the containment bag. The heat resistant bag is preferably made of flurocarbon resin film, such as DuPont Teflon ® PFA flurocarbon resin film or DuPont Teflon ®FEP flurocarbon resin film. Teflon ® PFA flurocarbon resin film has a melting temperature of 300°-310° C. depending on the thickness of the film, whereas Teflon ® FEP flurocarbon resin film is able to withstand temperatures up to 475° F. (245° C.) depending on the thickness of the film, without loss of properties. The high heat resistance of Teflon ® film, facilitates its use in a containment bag for the removal of pipe laggings which surround boiler room pipe while the boilers are in heat-producing use.

The arm sleeve/glove combination in the heat resistant bag is also made f flurocarbon resin film. The fluorocarbon resin film arm sleeve is heat sealed to the bag at a temperature above 535° F. The fluorocarbon resin film glove is also heat sealed to the external end of the arm sleeve. It is contemplated as being within the scope of the invention that the arm sleeve and glove are a single seamless unit which is heat sealed to the bag.

In a bag not considered for use in a high heat situation, the arm sleeve is preferably made from a spun bounded olefin, such as DuPont Tyvek ® arms which are coated with polyethylene by a known technique. The polyethylene insures against the penetration by the smallest of asbestos fibers. The arm sleeve is sewn or heat sealed to the bag. A latex glove is sewn or heat sealed to the external end of the arm sleeve. The arm sleeve and glove combination can be sized to order if needed.

The heat resistant containment bag can be produced by heat sealing one end of an appropriate length of flurocarbon resin lay-flat tubing or two sheets of fluorocarbon resin. A bag not considered for use in high heat situations can be produced by heat sealing of an appropriate length of a plastic lay-flat tubing or two overlapped sheets. The top and bottom edges of the tubing or heat sealed sheets extend generally parallel to one another. A portion of the opposite side edges also preferably extends parallel to each other and perpendicular to the top and bottom edges. A contoured shape for the bag can be formed by application of a heating wire or bar on the opposite sides of the containment bag. The heating wire or bar seals the sides of the bags in a desired configuration and slices off excess portions of the bag. Two sheets of flurocarbon resin may be overlapped on each other and the containment bag made from heat sealing the bottom and side edges in a preferred configuration.

Figure 2:
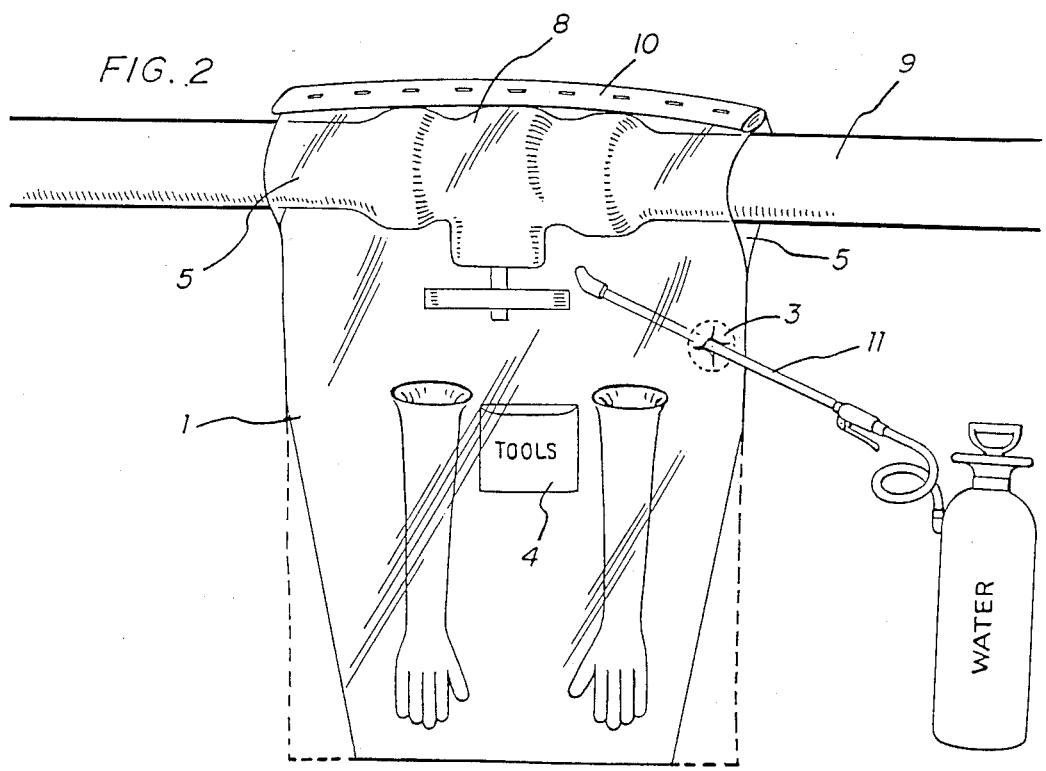
FIG. 2 is a schematic diagram of the containment device in position around an asbestos insulated valve with an appropriate wetting device in place to wet the asbestos insulation.

In FIGS. 1, 2 and 3, opposite side edges 20 and 22 extend parallel to each other over a portion of each side until reaching a portion of the side of the bag at or slightly below the securement point of the gloves on one side of the bag. At this point, the side edges 24 and 26 taper toward each other as they approach the bottom of the bag. Dotted lines 28 and 30 represent the original area of the lay-flat tubing or overlapped sheets forming the containment bag which have been removed by the heating wire or bar. The tapered side edges 24 and 26 aid in the transmittal of removed pipe lagging towards the bottom 34 of the bag.

Figure 5:
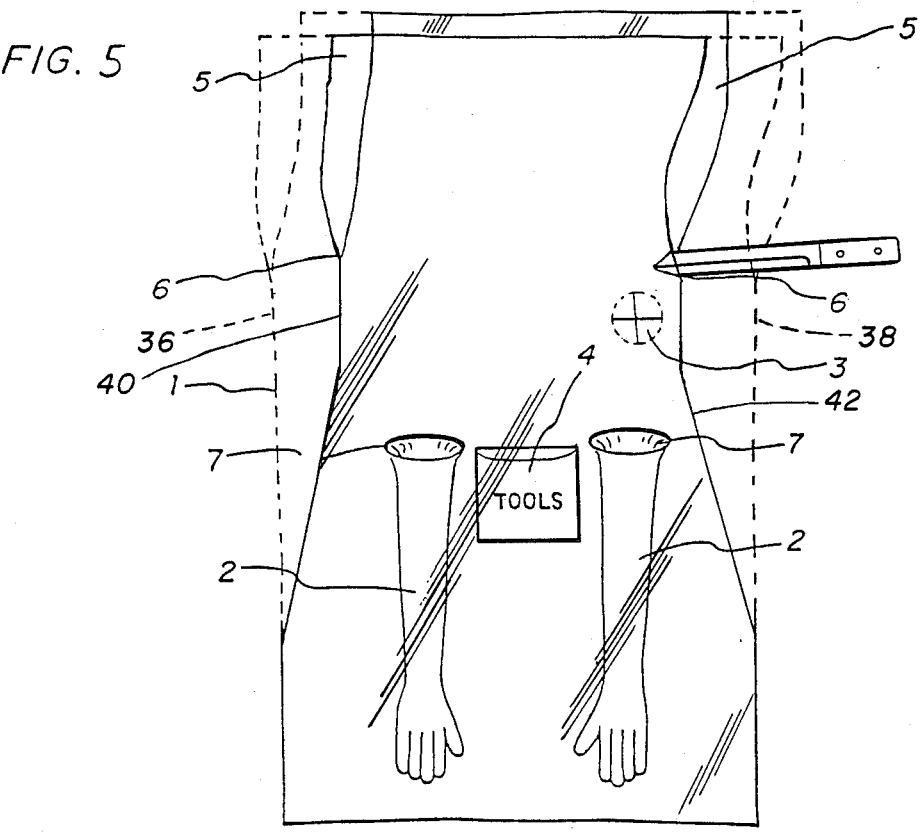
FIG. 5 is a schematic drawing of the containment device of the present invention.

The bag configuration of FIG. 5 is formed by removing a portion of the lay-flat tubing or overlapped sheets near the top of the bag. The dotted lines 36 and 38 show the original side edges of the tubing or sheets which have been removed by the heating wire or bar. The finished side edges 40 and 42 will, of course, have to be slit in the same manner as shown in FIG. 1 in order to form flaps 5. One advantage for the FIG. 5 configuration is that it provides greater bag volume for collecting the asbestos debris.

A tool pouch is formed also by heat sealing or otherwise laminating a "patch" of polyethylene film or flurocarbon resin to the inside surface of the containment bag, the seal occurring on three sides of the patch, the fourth side remaining open toward the top for the admission of tools or other materials.

The arm sleeves of the present invention are heat sealed to the bag in the following manner. An oval, thermal pressure-and-shaping device, approximately 6" in overlength and ¼" thick is used for attaching the Tyvek ® arm sleeves. The arm sleeves, with glove attached, is positioned inside the tube portion of the shaping device with the top edges of the sleeve folded over the outside of the device. The bag is then laid on top of the sleeve and heat sealed with a flat surface heating element to the film.

In the heat resistant bag, the flurocarbon resin arm sleeve/glove combination is heat sealed to the fluorocarbon resin bag by heat sealing at a temperature above 535°, sufficient to melt the fluorocarbon elements together. A hole can then be cut in the bag to form the opening into the arm sleeve.

Accordingly, the present invention allows an individual to work along a length of asbestos-covered pipe such as active boiler pipe without contaminating the individual or the surrounding room. All asbestos debris removed or disturbed by the task is contained in the sealed bag. A single bag may be used for work on a substantial length of pipe. After the first three foot section is cleared, the bag is slid into the adjacent section where the process is repeated. When the job is completed or the bag is full with debris, the bag is tied off close to the pipe, sealing in all asbestos removed from the pipe, and is then disposed of in the proper fashion.

Asbestos removal contractors have found the device particularly useful for handling asbestos often found on single pipes running across a room in schools or other such facilities. Use of the bag avoids the costly and time-consuming process of sealing, and later cleaning, the entire room.

The EPA asbestos control guidelines issued in May, 1983, advise that "Containment bags with sealed holes for hand access are alternatives to full room or full work area containment." ("Guidance for Controlling Friable Asbestos-Containing Materials in Buildings," EPA.) NIOSH's Division of Physical Sciences and Engineering reported in May, 1983, that, "If asbestos is present, it is necessary to . . . minimize exposure to a known carcinogen. In some cases, tasks can be accomplished in a completely enclosed bag that is disposed of, along with the small amount of waste involved. ("Control Technology For Asbestos Removal Contractors", NIOSH.)

Thus, it may be seen that the present invention provides a substantial advance in the art of asbestos and other hazardous material removal providing both safety to the worker in a high temperature environment and reduced cost to the contractors and parties being serviced.

It should be understood that changes may be made in the details of construction, arrangement or operation of the present invention without departing from the spirit of the invention.

I claim:

1. A disposable device adapted for receiving asbestos insulation and like hazardous materials, said disposable device comprising:
   a length of heat resistant lay-flat tubing forming a bag, said bag being flexible and collapsible and including
   two sides,
   two side edges formed by opposed folds of said bag,
   a top edge and a bottom edge of said bag, said bottom edge being sealed to close off a bottom of said bag and said top edge being open for entry of said asbestos insulation and like hazardous materials into the interior of said bag, and
   glove means sealed to one of said two sides of said bag for protected access to the interior of said bag from the exterior of said bag.

2. A disposable device according to claim 1, wherein said glove means includes two arm holes defined by one of said two sides of said bag and an arm sleeve attached to each of said two arm holes.

3. A device in accordance with claim 2, wherein a tool pouch is affixed to an inner surface of one side of said bag, intermediate said two arm holes and located between said two arm holes and said bottom edge of said bag.

4. A device in accordance with claim 1, wherein said bag is formed from 5 mil flurocarbon resin.

5. A device in accordance with claim 1, further comprising means for introducing reduced air pressure into said bag during removal of said hazardous material.

6. A device in accordance with claim 1, wherein said two side edges are slit from said top edge to provide opposed flaps at said top edge.

7. A device in accordance with claim 1, wherein said disposable device is used in combination with structural means having asbestos insulation thereon, said bag surrounding and extending below at least a portion of said structural means and defining a sealed enclosure, said sealed enclosure receiving and retaining the asbestos insulation removed from said structural means for disposal without subjecting said asbestos insulation to the open atmosphere.

8. A device in accordance with claim 7, wherein said bag is collapsed and sealed below said at least a portion of said structural means when said sealed enclosure has received the asbestos insulation from said structural means.

9. A device in accordance with claim 1, wherein said two side edges extend in a direction transverse to each other.

10. A device in accordance with claim 9, wherein said two side edges converge towards said bottom edge.

11. A device in accordance with claim 9, wherein said two side edges diverge from each other as said two side edges approach said bottom edge.

12. In combination for removal of asbestos insulation and like hazardous material, said combination comprising:
   (a) structural means having asbestos insulation thereon, (b) flexible bag means surrounding and extending below at least a portion of said structural means and defining a sealed enclosure, (c) said flexible bag means including a length of heat resistant lay-flat tubing having side edges formed at least in part by opposed folds of said tubing, parallel top and bottom edges and said flexible bag means further including at least one arm hole and one arm glove means sealed thereto and extending into said sealed enclosure, (d) means defined by said flexible bag means for access of at least one of a tubular wetting device and a vacuum device into said bag, and (e) said sealed enclosure receiving and retaining the asbestos insulation removed from said structural means for disposal without subjecting said asbestos insulation to the open atmosphere.

13. The combination of claim 12, wherein said side edges extend in a direction transverse to each other.

14. The combination of claim 13, wherein said side edges converge toward said bottom edge.

15. The combination of claim 13, wherein said side edges diverge from each other as said two side edges approach said bottom edge.

16. A disposable device adapted for receiving asbestos insulation and like hazardous materials, said disposable device comprising:

a length of lay-flat tubing forming a bag, said bag being flexible and collapsible and including
two sides,
two side edges formed by opposed folds of said bag, said two side edges joining said two sides together,
a top edge of said bag and a bottom edge of said bag, said two side edges extending substantially parallel to each other from said top edge of said bag to said bottom edge of said bag,
said top edge and said bottom edge extending substantially parallel to each other and extending substantially perpendicular to said two side edges,
said bottom edge being sealed to close off a bottom of said bag and said top edge having an opening for entry of said asbestos insulation and like hazardous materials into the interior of said bag, and
glove means heat sealed to one of said two sides of said bag for protected access to the interior of said bag from the exterior of said bag.

17. In combination for removal of asbestos insulation and like hazardous material, said combination comprising:

(a) structural means having asbestos insulation thereon, (b) flexible bag means surrounding and extending below at least a portion of said structural means and defining a sealed enclosure, (c) said flexible bag means including a length of lay-flat tubing having substantially parallel side edges formed by opposed folds of said tubing, substantially parallel top and bottom edges extending substantially perpendicular to said side edges and said flexible bag means further including at least one arm hole and one glove heat sealed thereto and extending into said sealed enclosure, (d) means defined by said flexible bag means for access of at least one of a tubular wetting device and a vacuum device into said bag, and (e) said sealed enclosure receiving and retaining the asbestos insulation removed from said structural means for disposal without subjecting said asbestos insulation to the open atmosphere.

18. A disposable device adapted for receiving asbestos insulation and like hazardous materials, said disposable device comprising:

a length of lay-flat tubing forming a bag, said bag being flexible and including
two sides,
two side edges,
a top edge, and
a bottom edge,
said bottom edge being sealed to close off a bottom of said bag and said top edge being open for entry of said asbestos insulation and like hazardous materials into the interior of said bag,
means defined on one side of said bag for access of a vacuum means into said bag, and
glove means heat sealed to one of said two sides of said bag for protected access to the interior of said bag from the exterior of said bag.

19. A device in accordance with claim 18, further including vacuum means for introducing negative air pressure into said bag in connection with removal of said hazardous material.

20. A device in accordance with claim 18, wherein said two side edges are slit from said top edge to provide opposed flaps at said top edge.

21. A device in accordance with claim 18, wherein said bag is formed from 5 mil fluorocarbon resin.

22. A device in accordance with claim 18, wherein said disposale device is used in combination with structural means having asbestos insulation thereon, said bag surrounding and extending below at least a portion of said structural means and defining a sealed enclosure, said sealed enclosure receiving and retaining the asbestos insulation removed from said structural means for disposal without subjecting said asbestos insulation to the open atmosphere.

23. A device in accordance with claim 22, wherein said bag is collapsed and sealed below said at least a portion of said structural means when said sealed enclosure has received the asbestos insulation from said structural means.

24. In combination for removal of asbestos insulation and like hazardous material, said combination comprising:

a flexible bag for surrounding and extending below at least a portion of a structural means and defining a sealed enclosure,
said flexible bag including a length of lay-flat tubing having side edges formed by opposed folds of said tubing, top and bottom edges and said flexible bag means further including at least one arm hole and one glove sealed thereto and extending into said sealed enclosure,
opening means in said flexible bag for access of a vacuum means into said bag, and
vacuum means in air flow communication with said sealed enclosure through said opening means for evacuating said sealed enclosure,
said sealed enclosure receiving and retaining asbestos insulation removed from said structural means for disposal without subjecting said asbestos insulation to the open atmosphere.

25. The combination of claim 24, wherein said side edges extend in a direction transverse to each other.

26. The combination of claim 25, wherein said side edges converge toward said bottom edge.

* * * * *

REEXAMINATION CERTIFICATE (1533rd)
United States Patent [19]
Natale

[11] B1 4,812,700
[45] Certificate Issued Aug. 13, 1991

[54] PORTABLE CONTAINMENT DEVICE FOR TREATMENT OF HAZARDOUS MATERIALS

[75] Inventor: Thomas Natale, Moorestown, N.J.

[73] Assignee: GPAC, Inc., Cinnaminson, N.J.

Reexamination Request:
No. 90/002,275, Feb. 11, 1991

Reexamination Certificate for:
Patent No.: 4,812,700
Issued: Mar. 14, 1989
Appl. No.: 936,509
Filed: Dec. 1, 1986

Related U.S. Application Data

[63] Continuation-in-part of Ser. No. 777,560, Sep. 18, 1985, Pat. No. 4,626,291, which is a continuation of Ser. No. 543,850, Oct. 20, 1983, abandoned.

[51] Int. Cl.⁵ .............................................. B08B 5/04
[52] U.S. Cl. ........................................ 312/1; 15/227; 98/115.4; 134/21; 138/97; 312/3

[56] References Cited

U.S. PATENT DOCUMENTS

| | | |
|---|---|---|
| 1,814,967 | 7/1931 | Royal . |
| 2,679,280 | 4/1954 | Marsh . |
| 2,707,985 | 5/1955 | Binnall . |
| 2,737,859 | 3/1956 | Allison et al. . |
| 3,237,533 | 3/1966 | Dewyer . |
| 3,396,701 | 8/1968 | Trexler . |
| 3,492,987 | 2/1970 | Parker . |
| 3,511,547 | 5/1970 | Schmieder et al. . |
| 3,622,421 | 11/1971 | Cook . |
| 3,675,542 | 7/1972 | Torigoe . |
| 4,285,681 | 8/1981 | Walitalo et al. . |

FOREIGN PATENT DOCUMENTS

| | | |
|---|---|---|
| 3004066A | 2/1980 | Fed. Rep. of Germany . |
| 1118657 | 4/1967 | United Kingdom . |
| 1296694 | 11/1970 | United Kingdom . |

OTHER PUBLICATIONS

*Asbestos Control Manual,* Norfolk Naval Shipyard, Portsmouth, Va., NAVSHPYDNORINST P6260-19B, Jan. 11, 1980.
*Hands in Bags,* Argil D. White, 1980.
"Safe-T-Strip, The Single Operator Moveable Glove Bag System", Asbeguard Equipment, Inc., undated.
"Asbestos kills, Strip insulation safely with ASBE-BAG", Insu-Strip, undated.
"Your cost-effective solution... ASBEBAG", Insu-Strip, undated.
"Asbestos removal problem is 'in the bag'", Industrial Management Nov., 1981, p. 45.
Asbestos removal kit, ASBEBAG, UCI Div. 15, Mechanical, Building Guide, Dec. 1981, p. 20.
New Products—"Asbestos problem is in the bag", Purchasing Management Digest, Oct. 1981, p. 16.
"Asbestos Removal Kit eliminates health hazard", circle-CIEN, Dec. 1981.
"Removes asbestos", Plant Management & Engineering, Nov. 1981, p. 60.
"Asbestos removal", Reader Service Card Number 122.

*Primary Examiner*—Joseph Falk

[57] ABSTRACT

A containment bag system specifically used for the removal of asbestos insulation from asbestos covered pipes and valves without contamination of the worker or the surrounding environment. A method of removing asbestos and other hazardous materials from limited areas uses a safe containment system. A method for manufacturing the containment system includes heat sealing a length of lay-flat tubing along a bottom edge and preferably along two side edges.

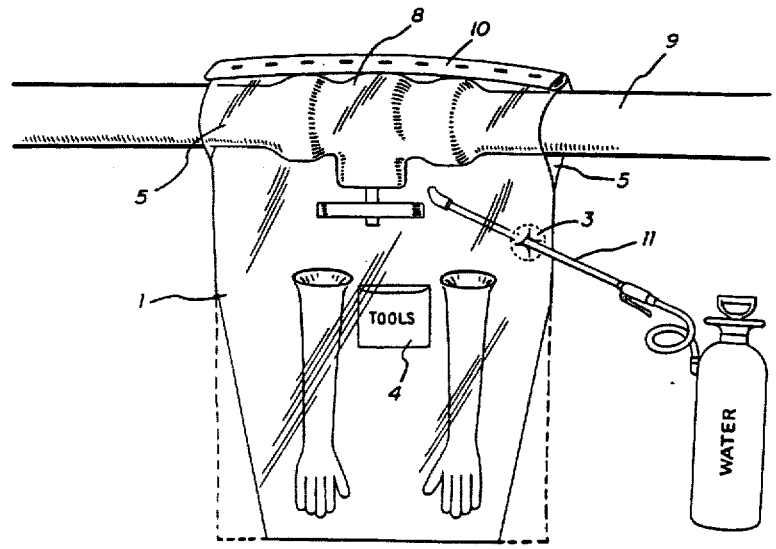

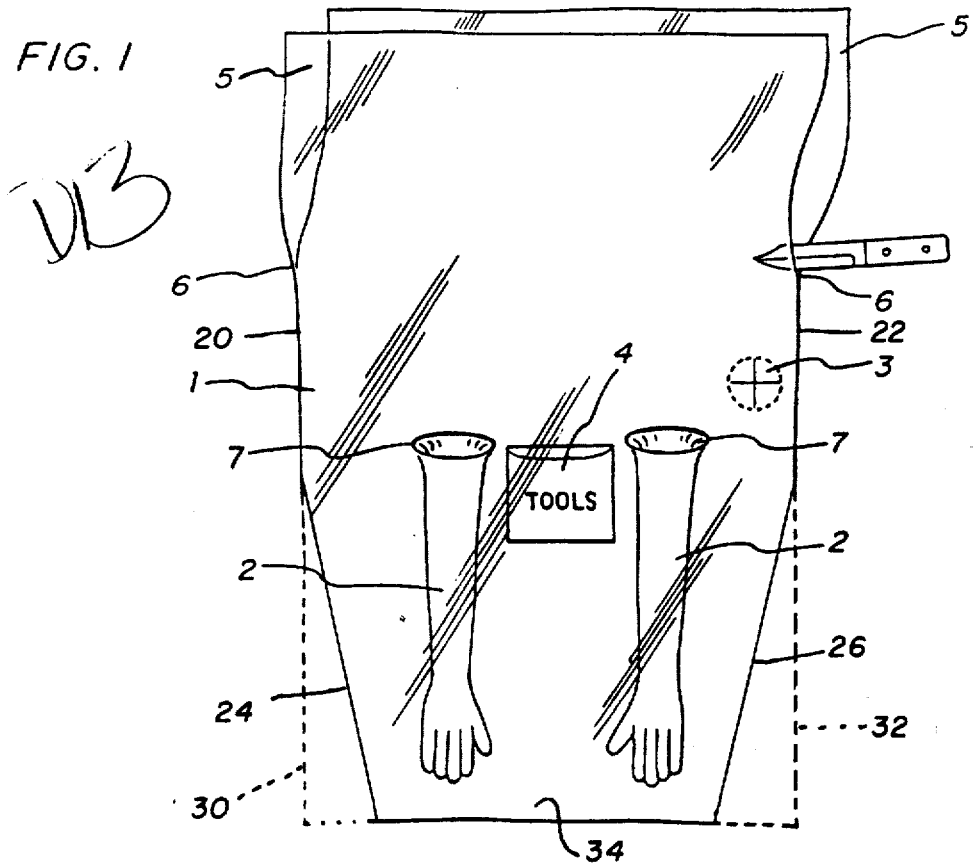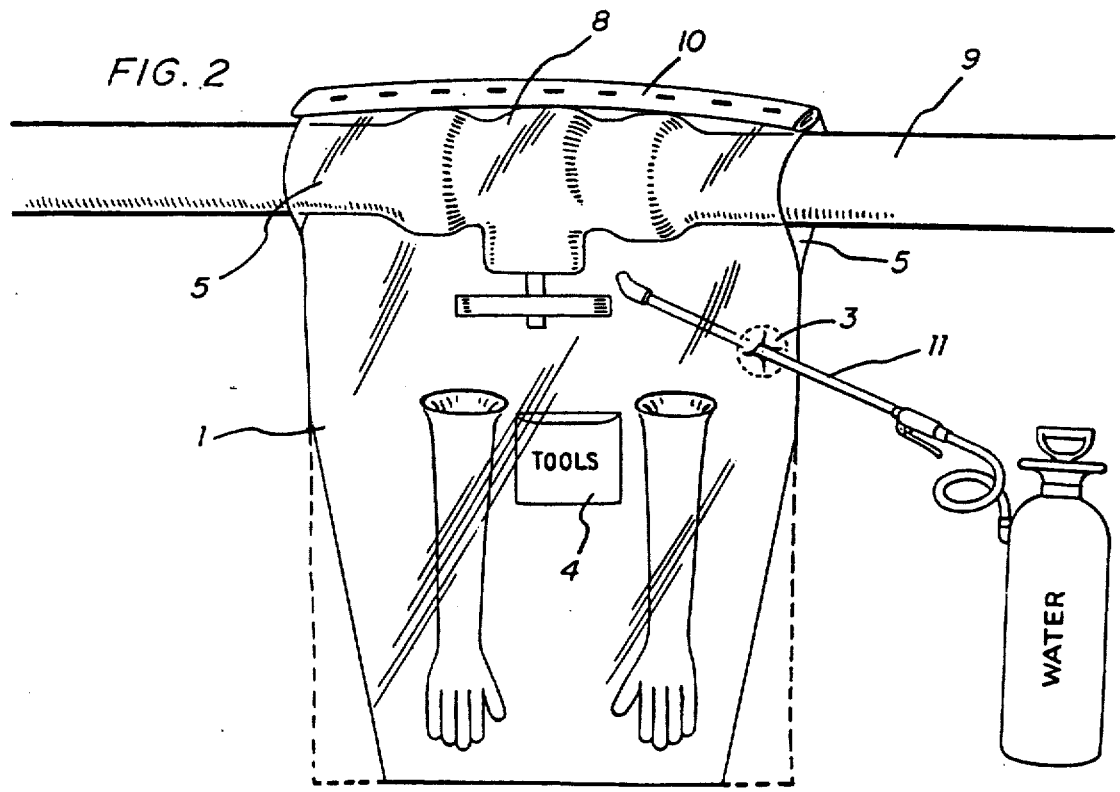

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-26 is confirmed.

* * * * *